(12) United States Patent
Zhang

(10) Patent No.: US 12,485,208 B2
(45) Date of Patent: Dec. 2, 2025

(54) BREAST PUMP

(71) Applicant: Yongqiang Zhang, AH (CN)

(72) Inventor: Yongqiang Zhang, AH (CN)

(73) Assignee: Yongqiang Zhang, Fuyang (CN)

( * ) Notice: Subject to any disclaimer, the term of this patent is extended or adjusted under 35 U.S.C. 154(b) by 154 days.

(21) Appl. No.: 18/329,730

(22) Filed: Jun. 6, 2023

(65) Prior Publication Data

US 2024/0024544 A1  Jan. 25, 2024

(30) Foreign Application Priority Data

Jul. 25, 2022 (CN) .......................... 202221920909.5

(51) Int. Cl.
    A61M 1/06  (2006.01)
(52) U.S. Cl.
    CPC .................................. A61M 1/069 (2021.05)
(58) Field of Classification Search
    CPC ................. A61M 1/069; A61M 1/06–1/06935
    USPC ..................................................... 604/74–76
    See application file for complete search history.

(56) References Cited

U.S. PATENT DOCUMENTS

| 10,881,766 | B2 | 1/2021 | O'Toole et al. |
| 10,926,011 | B2 | 2/2021 | O'Toole et al. |
| 11,260,151 | B2 | 3/2022 | O'Toole et al. |
| 11,357,894 | B2 | 6/2022 | O'Toole et al. |
| 2002/0198489 | A1* | 12/2002 | Silver .................... A61M 1/064 119/14.47 |
| 2015/0217033 | A1* | 8/2015 | Pollen .................... A61M 1/062 604/74 |
| 2015/0314053 | A1* | 11/2015 | Furrer .................... A61M 1/066 604/74 |
| 2018/0333523 | A1* | 11/2018 | Chang ............... A61M 1/06935 |
| 2019/0160211 | A1* | 5/2019 | Huang ............... A61M 1/0697 |
| 2021/0030934 | A1* | 2/2021 | Zhang ............... A61M 1/06935 |
| 2021/0196872 | A1 | 7/2021 | Chang |
| 2021/0322654 | A1 | 10/2021 | Bourquin et al. |
| 2022/0031918 | A1 | 2/2022 | Quackenbush |

FOREIGN PATENT DOCUMENTS

JP         3993928 B2 * 10/2007  .......... A61M 1/0068

* cited by examiner

Primary Examiner — Philip E Stimpert
(74) Attorney, Agent, or Firm — FIDELI LAW PLLC; Qiang Li

(57) ABSTRACT

A breast pump includes a milk bottle, a silica gel bowl, a silica gel flange and a main machine; the silica gel bowl is mounted inside the milk bottle, the side wall of the silica gel bowl is provided with an one-way valve, the silica gel bowl is provided with a milk collecting cavity and a negative pressure cavity, separated by a deformed wall of the silica gel bowl; the peripheral portion of the silica gel flange is tightly connected with the milk bottle, the central portion of the silica gel flange is tightly connected with the silica gel bowl and provided with a through hole communicated with the milk collecting cavity, and the inner wall of the milk bottle and the inner wall of the silica gel flange enclose to form the milk storage cavity; the main machine is arranged on the outside of the milk bottle.

12 Claims, 2 Drawing Sheets

BREAST PUMP

FIELD OF THE INVENTION

The disclosure relates to the technical field of maternal and infant supplies, particularly, relates to a breast pump.

BACKGROUND OF THE INVENTION

Currently, Breast pump is a common kind of maternal and infant supplies, which the women in lactation period use for suck and store their milk for infants in case of need. The diaphragm is driven by the air pump in the breast pump so that negative pressure is generated inside it, simulating baby sucking action, promoting the milk to flow into the low-pressure or negative-pressure region in the breast pump. However, when a user uses an existing breast pump, milk reflux often occurs. That is, when the user is using the breast pump, because the air pump reciprocates to drive the diaphragm, the air pressure inside the breast pump is continuously changed, when it is switched to the normal pressure state, the milk originally stored in the milk storage area in the breast pump will be reflux, and finally is splashed on the user's body so that the waste is caused, and the skin or clothes of the user are polluted.

Accordingly, there is a urgent need for a breast pump to avoid reflux of milk that has already been stored in the milk storage area.

SUMMARY OF THE INVENTION

The object of the disclosure is to provide a breast pump, which can improve the mounting efficiency and avoid reflux of milk that has already been stored in the milk storage area.

In order to achieve the object, the disclosure adopts the following technical scheme:

The breast pump includes a grooved milk bowl, a silica gel bowl, a silica gel flange, and the main engine.

The silica gel bowl is mounted inside the grooved milk bowl, a side wall of the silica gel bowl is provided with an one-way valve, the silica gel bowl is also provided with a milk collecting cavity and a negative pressure cavity, the milk collecting cavity and the negative pressure cavity is separated by a deformable wall of the silica gel bowl.

A peripheral portion of the silica gel flange is tightly connected with a peripheral portion of said grooved milk bowl, a central portion of the silica gel flange is tightly connected with the silica gel bowl, the central portion is provided with a through hole, the through hole is communicated with the milk collecting cavity, and an inner wall of the grooved milk bowl and an inner wall of the silica gel flange enclose to form a milk storage cavity. The one-way valve is in said milk storage cavity.

A main engine is mounted on an outside of the grooved milk bowl, a suction end of the main engine is communicated with the negative pressure cavity, the main engine is used for forming negative pressure in the negative pressure cavity so that the deformable wall can reciprocate between the milk collecting cavity and the negative pressure cavity, and milk in the milk collecting cavity can unidirectionally flow into the milk storing cavity through the one-way valve.

As an optional technical scheme, the silica gel bowl and the one-way valve are integrally formed.

As an optional technical scheme, the deformable wall is designed into a wave-shaped structure.

As an optional technical scheme, a periphery of the deformable wall extends towards a wall of the grooved milk bowl and is provided with a connecting ring, the grooved milk bowl is provide with a support ring, the connecting ring is tightly sleeved on the support ring, and the connecting ring, the deformable wall and the support ring jointly enclose to form the negative pressure cavity.

As an optional technical scheme, the main engine is arranged the out side of the grooved milk bowl, the grooved milk bowl is provided with a vent hole communicated with the negative pressure cavity, and the vent hole is communicated with the suction end of the main engine and the negative pressure cavity.

As an optional technical scheme, the central portion is depressed towards the inner part of the grooved milk bowl, one side of the central portion deviating from the grooved milk bowl forms an adapting cavity, the through hole is positioned at a bottom of the adapting cavity and is communicated with the adapting cavity.

As an optional technical scheme, a reinforcing ring is arranged between the silica gel bowl and the central portion, and the reinforcing ring is used for improving connection strength of the silica gel bowl and the central portion.

As an optional technical scheme, a top of the silica gel bowl is provided with a connecting hole, a side wall of the through hole extends into the connecting hole, and the reinforcing ring is disposed between the connecting hole and the through hole, and one end of the reinforcing ring extending into the connecting hole is provided with a first snap ring, and the first snap ring is clamped on an inner wall of the connecting hole.

As an optional technical scheme, one side of the central portion facing to the milk storage cavity is provided with a second snap ring, a positioning groove is formed between the second snap ring and a side wall of the through hole, one end of the reinforcing ring, extending out of the connecting hole, is provided with a third snap ring and a fourth snap ring, the second snap ring abuts against a top of the third snap ring, a top of the silica gel bowl is provided with a fifth snap ring, the fifth snap ring is located around the connecting hole, the fifth snap ring abuts against the bottom of the third snap ring, and the fourth snap ring is inserted into the positioning groove.

As an optional technical scheme, the peripheral portion is provided with a buckle, the side wall of the grooved milk bowl is provided with a clamping hole, the clamping hole is communicated with the milk storage cavity, and the buckle is hermetically clamped in the clamping hole.

The advantage of the disclosure are as follows:

The disclosure provides a breast pump, which includes the grooved milk bowl, the silica gel bowl, the main engine and the silica gel flange. When the user uses the breast pump, the silica gel flange is tightly attached to the user's breast, the main engine is started to suck air to form negative pressure in the negative pressure cavity, the deformable wall moves towards the negative pressure cavity so that the volume of the negative pressure cavity is reduced and the volume of the connecting cavity is increased, the milk collecting cavity forms negative pressure due to the increased volume to simulate the baby's sucking action. The milk passes through the through hole and flows into the milk collecting cavity. At this time, the milk collecting cavity is in negative pressure state so that the one-way valve is in a closed state. The milk in the milk collecting cavity can not pass through the one-way valve to enter the milk storing cavity, the milk in the milk storage cavity cannot reversely pass through the one-way valve to enter the milk collecting cavity, preventing the milk in the milk storing cavity from flowing back to the milk collecting cavity. Thereafter, the main engine stops running, the deformable wall is reset toward the milk collecting cavity, the volume of the negative pressure cavity is increased and the volume of the milk collecting cavity is reduced, the milk collecting cavity is pressurized due to reduced volume, so that the one-way valve is opened, the milk collected in the milk collecting cavity passes through the one-way valve and flows into the milk storing cavity. The main engine continuously switches the running state and repeatedly switches between starting and stopping to simulate the baby's suction action until the amount of the milk in the milk storage cavity reaches the preset value. Then the breast pump can be taken down from the user's breast. The silica gel bowl of the disclosure can be directly arranged inside the grooved milk bowl, and the assembly efficiency is high. In the disclosure, the silica gel bowl is provided with the milk collecting cavity and the negative pressure cavity, separated by the deformable wall, so that the deformation resistance of the deformable wall is reduced; and when the deformable wall resets towards one side of the milk collecting cavity, the deformable wall can drive the milk to pass through the one-way valve and enter the milk storage cavity.

BRIEF DESCRIPTION OF THE DRAWINGS

The following detailed description of the disclosure is carried out according to the attached drawings and embodiments.

DETAILED DESCRIPTION OF ILLUSTRATED EMBODIMENTS

Figure 1:
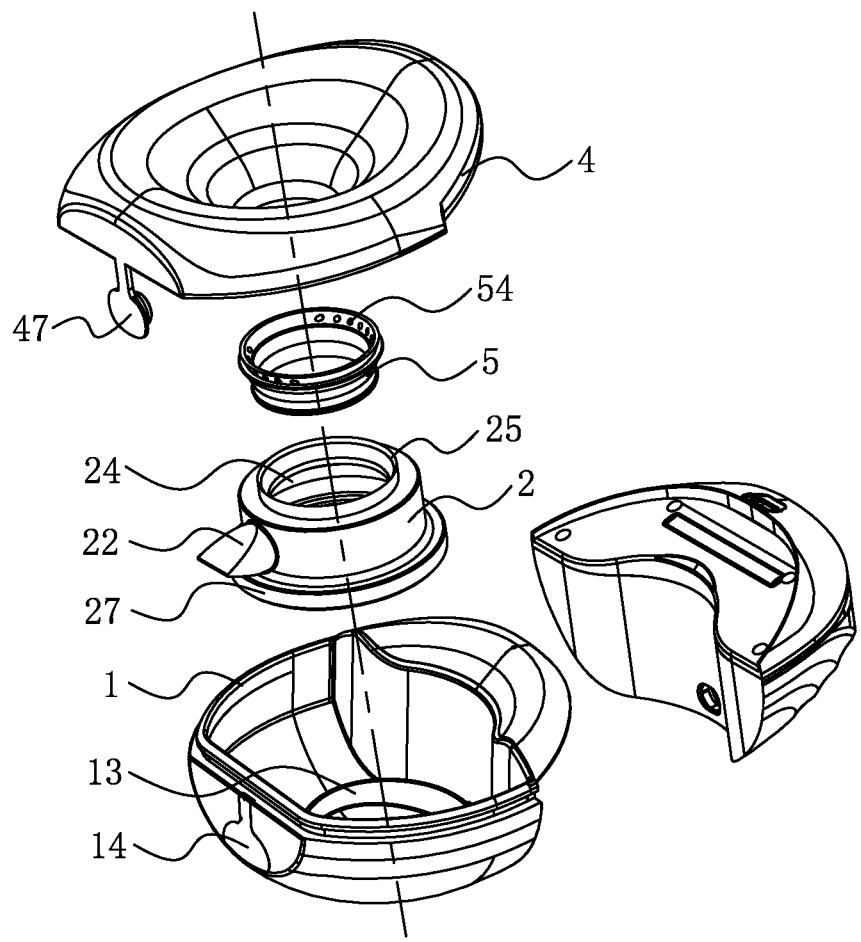
FIG. 1 is an explosion view of the breast pump in an embodiment according to the disclosure.

In order to the technical problems, the adopted technical scheme and the achieved technical effect are clearer, the technical scheme according to the embodiment in the disclosure is further described in detail by combining with the drawings. Obviously, the described embodiments are only a part, but not all embodiments. Based on the embodiments in the disclosure, and all other embodiments obtained by those skilled in the field without creative work belong to the protection range of the disclosure.

In the embodiment of the invention, unless other specified and qualified, the terms "installation", "connection", "fixed" and other terms shall be broadly understood, for example, it may be fixed connection, detachable connection, or integration; it may be a mechanical connection or an electrical connection; it may be directly connected or indirectly connected by intermediate media, it may be an internal connection of two components or the interaction of two components. For ordinary technicians in the field, the specific meaning of the above term in the embodiment of the invention can be understood according to the specific circumstances.

In the embodiment of the invention, unless other specified and qualified, the terms the terms "first" and "second" are used only for descriptive purposes and they can not be understood as indicating or implying relative importance or implicitly the number of technical features indicated. Thus, the qualification of "first" and "second" features may include one or more of them explicitly or implicitly. In the description of the embodiments of the invention, the meaning of "multiple" is two or more, unless otherwise specified.

In the disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, that, a first feature is "on", "above", or "on top of" a second feature, may include an embodiment in which the first feature is right or obliquely "on", "above", or "on top of" the second feature, or just means that the first feature is at a height higher than that of the second feature. while that, a first feature is "below", "under", or "on bottom of" a second feature, may include an embodiment in which the first feature is right or obliquely "below", "under", or "on bottom of" the second feature, or just means that the first feature is at a height lower than that of the second feature.

In the description of the embodiment of the disclosure, it needs to be understood that the azimuth or position relation indicated in the terms "upper", "lower", "left", "right" and so on are based on the azimuth or position relation shown in the attached drawing, only for the convenience of describing the embodiment of the disclosure and simplifying the description, rather than indicating or implying that the device or element must have a specific orientation, with a specific orientation and operation, so it can not be understood as a limitation to the disclosure.

In addition, the terms the terms "first" and "second" are used only for descriptive purposes and they can not be understood as indicating or implying relative importance or implicitly the number of technical features indicated.

Figure 2:
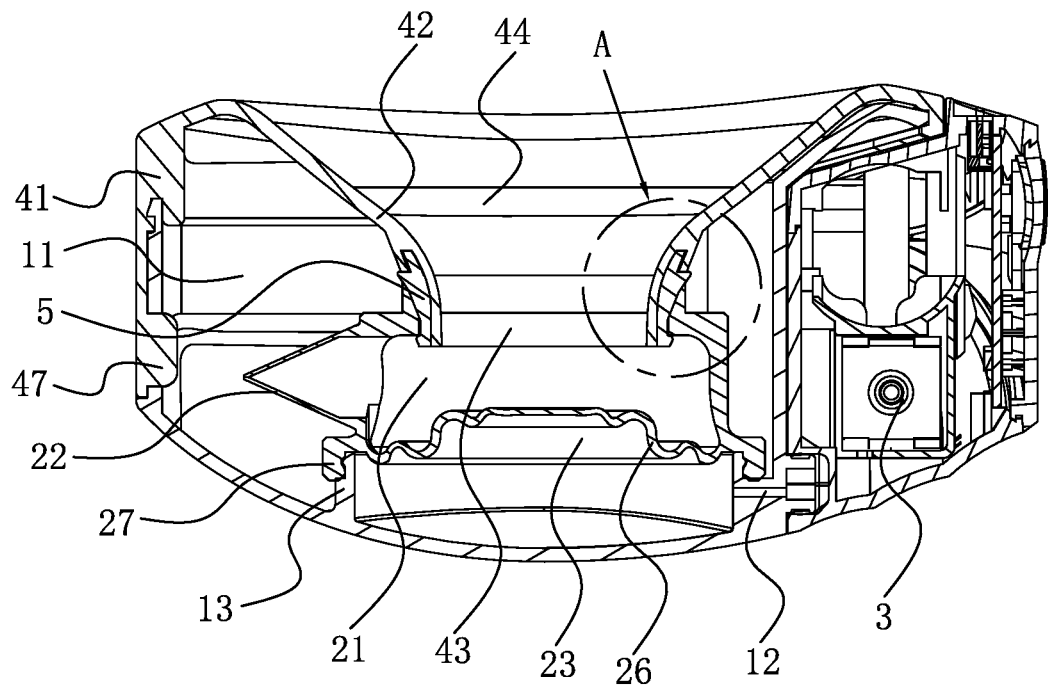
FIG. 2 is a cross-sectional view of the breast pump in an embodiment according to the disclosure.
Figure 3:
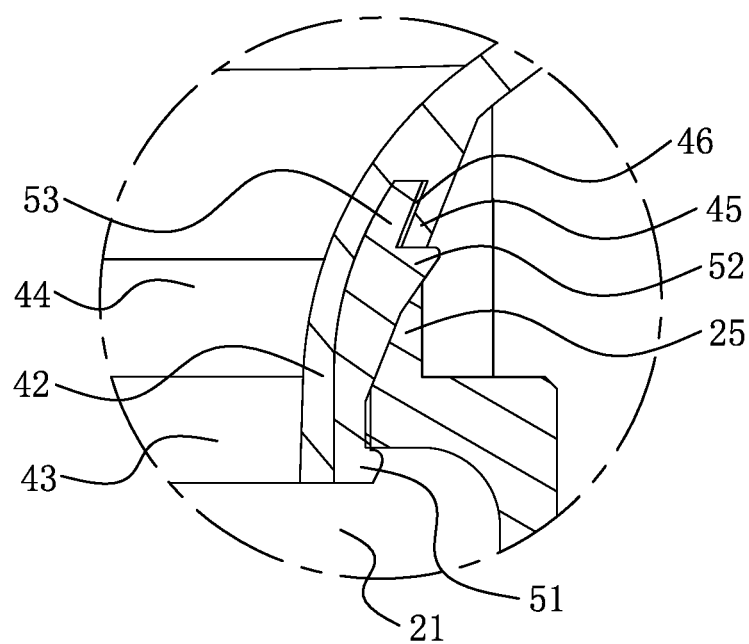
FIG. 3 is an enlarged view of the position A in FIG. 2.

Referring to FIG. 1 to FIG. 3, in the embodiment, a breast pump includes a grooved milk bowl 1, a silica gel bowl 2, a main engine 3, and a silica gel flange 4. The silica gel bowl 2 is mounted in the grooved milk bowl 1, a side wall of the silica gel bowl 2 is provided with an one-way valve 22, the silica gel bowl 2 is also provided with a milk collecting cavity 21 and a negative pressure cavity 23, separated by a deformable wall 26 of the silica gel bowl 2. A periphery 41 of the silica gel flange 4 is tightly connected with a peripheral portion of the grooved milk bowl 1, a central portion 42 of the silica gel flange 4 is tightly connected with the silica gel bowl 2, the central portion 42 is provided with a through hole 43, the through hole 43 is communicated with the milk collecting cavity 21, and an inner wall of the grooved milk bowl 1 and an inner wall of the silica gel flange 4 enclose to form a milk storage cavity 11. The one-way valve is in the milk storage cavity. The main engine is mounted in the out side 41 of the grooved milk bowl 1, the a suction end of the main engine 3 is communicated with the negative pressure cavity 23, the main engine 3 is used for forming negative pressure in the negative pressure cavity 23 so that the deformable wall 26 can reciprocate between the milk collecting cavity 21 and the negative pressure cavity 23, and milk in the milk collecting cavity 21 can unidirectionally flow into the milk storing cavity 11 through the one-way valve 22.

Specifically, when a user uses the breast pump, the silica gel flange 4 is tightly attached to the user's breast, the main engine 3 is started to suck air to form negative pressure in the negative pressure cavity 23, the deformable wall 26 moves towards the negative pressure cavity 23 so that the volume of the negative pressure cavity 23 is reduced and the volume of the connecting cavity 21 is increased, the milk collecting cavity 21 forms negative pressure due to the increased volume to simulate the baby's sucking action. The milk passes through the through hole 43 and flows into the milk collecting cavity 21. At this time, the milk collecting cavity 21 is in negative pressure state so that the one-way valve is in a closed state. The milk in the milk collecting cavity 21 can not pass through the one-way valve to enter the milk storing cavity 11. And the milk in the milk storage cavity 11 also cannot reversely pass through the one-way valve to enter the milk collecting cavity 21, preventing the milk in the milk storing cavity 11 from flowing back to the milk collecting cavity 21. Thereafter, the main engine stops running, the deformable wall 26 is reset toward the milk collecting cavity 21 due to its elastic potential energy of restoring its original state, the volume of the negative pressure cavity 23 is increased and the volume of the milk collecting cavity 21 is reduced, the milk collecting cavity 21 is pressurized due to reduced volume, so that the one-way valve 22 is opened, the milk collected in the milk collecting cavity 21 passes through the one-way valve 22 and flows into the milk storing cavity 11. The main engine 1 continuously and repeatedly switches between starting and stopping to simulate the baby's suction action until the amount of the milk in the milk storage cavity 11 reaches preset value. Then the breast pump can be taken down from the user's breast. The silica gel bowl 2 according to the embodiment in the disclosure can be directly arranged inside the grooved milk bowl 1, and the assembly efficiency is high. In the disclosure, the silica gel bowl 2 is provided with the milk collecting cavity 21 and the negative pressure cavity 23, separated by the deformable wall so that the deformation resistance of the deformable wall 26 is reduced; and when the deformable wall 26 resets towards one side of the milk collecting cavity 21, the deformable wall 26 can drive the milk to pass through the one-way valve 22 and enter the milk storage cavity 11.

Optionally, the one-way valve 22 is a connecting cylinder with a clip-type structure arranged at the tail end, an opening is arranged in the middle of the clip-type structure, and the one-way valve 22 can only be opened in a single direction, that is the direction that the milk collecting cavity 21 facing to the milk storing cavity 11.

In this embodiment, the main engine 3 is a miniature vacuum pump.

In this embodiment, the out side of the grooved milk bowl is mounted with a control circuit board, electrically connected with the main engine 3, and used for controlling the main engine 3 to intermittently start.

In the embodiment, the breast pump is a wearable breast pump. The user can wear the breast pump, the one-way valve 22 is below the milk collecting cavity 21, the milk in it can utilize itself gravity to pass through the one-way valve 22 to enter the milk storing cavity 11.

Optionally, the silica gel bowl 2 and the one-way valve 22 are integrally formed, and the one-way valve 22 serving as one part of the silica gel bowl 2 can be synchronously mounted in the grooved milk bowl 1 together with the silica gel bowl 2 so that the mounting efficiency is improved.

Optionally, the deformable wall 26 is configured in a wavy configuration to enhance its deformability.

Optionally, an outer periphery of the deformable wall 26 extends towards a wall body of the grooved milk bowl 1 and is provided with a connecting ring 27, the grooved milk bowl 1 is provide with a support ring 13, the connecting ring 17 is tightly sleeved on a periphery of the support ring 13, and the connecting ring 27, the deformable wall 26 and the support ring 13 jointly enclose to form the negative pressure cavity 23. When the silica gel bowl 2 is assembled in the grooved milk bowl 1, the connecting ring 27 is directly sleeved on the periphery of the support ring 13. The assemblymen is convenience, and the silica gel bowl 2 is made of silica gel, the plasticity is strong, the connecting ring 27 can be ensured to be tightly attached to the outer wall of the supporting ring 13, and the milk in the milk storage cavity 11 is prevented from leaking and entering the negative pressure cavity 23.

Optionally, the main engine 3 is mounted at the out side of the grooved milk bowl 1, the grooved milk bowl is provided with the air vent 12 communicated with the negative pressure cavity 23, the air vent 12 is communicated with the suction end of the main engine 3 and the negative pressure cavity 23. In the embodiment, the main engine 3 is arranged at the out side of the grooved milk bowl 1 so that the milk storage capacity of the milk storage cavity 11 is improved, and the milk in it can be prevented from being polluted by the main engine 3.

Optionally, the central portion 42 is concave towards the inside of the grooved milk bowl 1, one side of the centre 42 facing away from the milk storage cavity 11 forms an adapting cavity 44, The through hole 43 is positioned at a bottom of the adapting cavity 44 and is communicated with the adapting cavity 44. When the user uses the breast pump, the user's breast is adapted to the adapting cavity 44 so that the sealing performance and the wearing comfort are ensured, and the milk is prevented from passing through the gap to be scattered to other body parts of the user's other body parts. When the milk collecting cavity 21 is in a negative pressure state, the milk can pass through the through hole 43 to flow into the milk collecting cavity 21.

Optionally, a reinforce ring 5 is provided between the silica gel bowl 2 and the central portion 42, the reinforce ring 5 is used for improving the connection strength of the silica gel bowl 2 and the central portion 42. The silica gel flange 4 and the silica gel bowl 2 are both made of silica gel material, The connection stability of the silica gel flange 4 and the silica gel bowl 2 needs to be improved by the reinforcing ring 5 so that the central portion 42 is prevented from sliding relative to the silica gel bowl 2 or collapsing into the milk collecting cavity 21 when the milk collecting cavity 21 in a negative pressure state. The reinforcing ring 5 is made of hard materials such as aluminum alloy, stainless steel or plastics, etc.

In the embodiment, the inner of the grooved milk bowl 1 is only arranged with the silica gel bowl 2 and the reinforcing ring 5, while the reinforcing ring 5 can be fixedly sleeved on the silica gel bowl 2, so that the reinforcing ring 5 and the silica gel bowl 2 can be integrally arranged in the grooved milk bowl 1, the mounting efficiency is improved, the grooved milk bowl 1 is miniaturized, thus, the overall size of the breast pump is reduced which is convenience for the user to wear; and when the user uses the breast pump in the embodiment, the daily work is not influenced.

Optionally, a top of the silica gel bowl 2 is provided with a connecting hole 24. The side wall of the through hole 43 extends into the connecting hole 24, the reinforcing ring 5 is arranged between the side wall of the connecting hole 24 and the side wall of the through hole 43, and one end of the reinforcing ring 5 extending into the connecting hole 24 is provided with a first snap ring 51, and the first snap ring 51 is clamped on the inner wall of the connecting hole 24, so that the reinforcing ring 5 and the central portion 42 are prevented from being separated from the silica gel bowl 2, and the stability of connection is ensured.

Optionally, one side of the central portion 42 facing to the milk storage cavity 11 is provided with a second snap ring 45, a positioning groove 46 is formed between the second snap ring 45 and the side wall of the through hole 43, one end of the reinforcing ring 5 extending out of the connecting hole 24 is provided with a third snap ring 52 and a fourth snap ring 53. The second snap ring 45 abuts against the top of the third snap ring 52. The top of the silica gel bowl 2 is provided with a fifth snap ring 25, the fifth snap ring 25 is located around the connecting hole 24, the fifth snap ring 25 abuts against the bottom of the third snap ring 52, the fourth snap ring 53 is inserted into the positioning groove 46. And if the central portion 42 is stressed towards the silica gel bowl 2, the third snap ring 52 and the fourth snap ring 53 can limit the position between the central portion 42 and the silica gel bowl 2, so that the side wall of the through hole 43 can be prevented from sliding into the milk collecting cavity 21.

Optionally, the inner side wall of the fifth snap ring 25 is an inclined surface, the diameter of the upper end opening of the fifth snap ring 25 is larger than that of the lower end opening of the fifth snap ring 25, and the inclined surface of the fifth snap ring 25 is matched with the outer side wall of the reinforcing ring 5, so that the assembly convenience of the reinforcing ring 5 in the connecting hole 24 is improved.

Optionally, the fourth snap ring 53 is provided with the air holes 54 so that when the fourth snap ring 53 is snapped into the positioning groove 46, air in the positioning groove 46 can be conveniently exhausted.

Optionally, the peripheral portion 41 is provided with a buckle 47, the side wall of the grooved milk bowl 1 is provided with a clamping hole 14 communicated with the milk storage cavity 11, the buckle 47 is sealed and clamped in the clamping hole 14. The connection stability of the silica gel flange 4 and the grooved milk bowl 1 is improved; and when milk in the milk storage cavity 11 needs to be poured out, the silica gel flange 4 can be integrally separated from the grooved milk bowl 1, or only the clamping hole 14 needs to be opened, the milk can be poured out from the clamping hole 14 after the buckle 47 is separated from the clamping hole 14, the silica gel flange 4 is not necessary to separate from the grooved milk bowl 1.

In addition, the above description are only the preferred embodiment of the disclosure and the applied technical principles. Those skilled in the art will understand that, the disclosure is not limited to the specific embodiments described herein, various obvious changes, readjustments and substitutions can be made to those skilled in the art without departing from the scope of protection of the disclosure. Although the disclosure is described in more detail through the above embodiments, the disclosure is not limited to the above embodiments, but can also include more other equivalent embodiments without departing from the conception of the disclosure, and the scope of the disclosure is determined by the scope of the claim.

What is claimed is:

1. A breast pump, comprising:
a grooved milk bowl;
a silica gel bowl, mounted in said grooved milk bowl, a side wall of said silica gel bowl is provided with a one-way valve, said silica gel bowl is also provided with a milk collecting cavity and a negative pressure cavity, separated by a deformable wall of said silica gel bowl;
a silica gel flange, a peripheral portion of said silica gel flange is tightly connected with a peripheral portion of said grooved milk bowl, a central portion of said silica gel flange is tightly connected with said silica gel bowl, said central portion is provided with a through hole communicated with said milk collecting cavity, and an inner wall of said grooved milk bowl and an inner wall of said silica gel flange form and enclose a milk storage cavity; and,
a main engine, mounted on an outside of said grooved milk bowl,
a suction end of said main engine is communicated with said negative pressure cavity, said main engine is used for forming negative pressure in said negative pressure cavity so that said deformable wall can reciprocate between said milk collecting cavity and said negative pressure cavity, and milk in said milk collecting cavity can unidirectionally flow into said milk storing cavity through said one-way valve;
said peripheral portion of said silica gel flange is provided with a buckle, a side wall of said grooved milk bowl is provided with a clamping hole, said clamping hole is communicated with said milk storage cavity, and said buckle is hermetically clamped in said clamping hole.

2. The breast pump according to claim 1, wherein said silica gel bowl and said one-way valve are integrally formed.

3. The breast pump according to claim 1, wherein said deformable wall is designed into a wave-shaped structure.

4. The breast pump according to claim 2, wherein said deformable wall is designed into a wave-shaped structure.

5. The breast pump according to claim 1, wherein a periphery of said deformable wall extends towards a wall of said grooved milk bowl and is provided with a connecting ring, said grooved milk bowl is provided with a support ring, said connecting ring is tightly sleeved on said support ring, and said connecting ring, said deformable wall and said support ring jointly enclose and form said negative pressure cavity.

6. The breast pump according to claim 2, wherein a periphery of said deformable wall extends towards a wall of said grooved milk bowl and is provided with a connecting ring, said grooved milk bowl is provided with a support ring, said connecting ring is tightly sleeved on said support ring, and said connecting ring, said deformable wall and said support ring jointly enclose and form said negative pressure cavity.

7. The breast pump according to claim 5, wherein said milk storage grooved milk bowl is provided with a vent hole communicated with said negative pressure cavity and said suction end of said main engine.

8. The breast pump according to claim 6, wherein said milk storage grooved milk bowl is provided with a vent hole communicated with said negative pressure cavity and said suction end of said main engine.

9. The breast pump according to claim 1, wherein said central portion is depressed towards said grooved milk bowl, one side of said central portion deviating from said grooved milk bowl forms an adapting cavity, said through hole is positioned at a bottom of said adapting cavity and communicated with said adapting cavity.

10. The breast pump according to claim 9, wherein a reinforcing ring is arranged between said silica gel bowl and said central portion, and said reinforcing ring is used for improving connection strength of said silica gel bowl and said central portion.

11. The breast pump according to claim 10, wherein a top of said silica gel bowl is provided with a connecting hole, a side wall of said through hole extends into said connecting hole, and said reinforcing ring is disposed between said connecting hole and said through hole, and one end of said reinforcing ring extending into said connecting hole is provided with a first snap ring, and said first snap ring is clamped on an inner wall of said connecting hole.

12. The breast pump according to claim 11, wherein one side of said central portion facing to said milk storage cavity is provided with a second snap ring, a positioning groove is formed between said second snap ring and a side wall of said through hole, one end of said reinforcing ring, extending out of said connecting hole is provided with a third snap ring and a fourth snap ring, said second snap ring abuts against a top of said third snap ring, a top of said silica gel bowl is provided with a fifth snap ring, said fifth snap ring is located around said connecting hole, said fifth snap ring abuts against said bottom of said third snap ring, and said fourth snap ring is inserted into said positioning groove.

\* \* \* \* \*